(12) United States Patent
Yamaguchi et al.

(10) Patent No.: US 7,805,016 B2
(45) Date of Patent: Sep. 28, 2010

(54) DECODING APPARATUS AND DECODING METHOD

(75) Inventors: Noboru Yamaguchi, Saitama-ken (JP); Tomoya Kodama, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 994 days.

(21) Appl. No.: 11/557,590

(22) Filed: Nov. 8, 2006

(65) Prior Publication Data
US 2007/0140574 A1 Jun. 21, 2007

(30) Foreign Application Priority Data
Dec. 16, 2005 (JP) ............................. 2005-363626

(51) Int. Cl.
*G06K 9/40* (2006.01)
(52) U.S. Cl. ................... 382/268; 382/261; 382/275
(58) Field of Classification Search ............... 382/254, 382/260–266, 275
See application file for complete search history.

(56) References Cited

U.S. PATENT DOCUMENTS

| | | | | |
|---|---|---|---|---|
| 5,883,983 | A * | 3/1999 | Lee et al. .................... | 382/268 |
| 6,240,135 | B1 | 5/2001 | Kim | |
| 6,594,400 | B1 * | 7/2003 | Kim .......................... | 382/268 |
| 6,801,669 | B2 | 10/2004 | Chujoh et al. | |
| 6,907,144 | B1 * | 6/2005 | Gindele ...................... | 382/275 |
| 7,003,174 | B2 * | 2/2006 | Kryukov et al. ............. | 382/266 |
| 7,085,427 | B2 | 8/2006 | Chujioh et al. | |
| 7,136,536 | B2 * | 11/2006 | Andersson et al. ........... | 382/261 |
| 7,139,437 | B2 * | 11/2006 | Jones et al. ................. | 382/261 |
| 7,155,067 | B2 * | 12/2006 | Jayant et al. ................ | 382/268 |
| 7,426,315 | B2 * | 9/2008 | Frishman et al. ............ | 382/268 |
| 7,471,845 | B2 * | 12/2008 | Deshpande ................. | 382/261 |
| 2003/0020835 | A1 * | 1/2003 | Petrescu .................... | 348/625 |
| 2004/0081363 | A1 * | 4/2004 | Gindele et al. ............... | 382/260 |
| 2005/0117812 | A1 * | 6/2005 | Nishi et al. ................. | 382/268 |
| 2006/0181740 | A1 * | 8/2006 | Kim et al. .................. | 358/3.26 |

(Continued)

FOREIGN PATENT DOCUMENTS

JP 11-98505 4/1999

(Continued)

OTHER PUBLICATIONS

U.S. Appl. No. 12/404,578, filed Mar. 16, 2009, Takeshima et al.

*Primary Examiner*—Samir A. Ahmed
*Assistant Examiner*—Li Liu
(74) *Attorney, Agent, or Firm*—Oblon, Spivak, McClelland, Maier & Neustadt, L.L.P.

(57) ABSTRACT

A decoding apparatus having a de-ringing filter to filter image data decoded from encoded image data by orthogonal transformation encoding. In the de-ringing filter, a subtracter generates an absolute value of difference between a value of a filter object pixel and a value of at least one pixel selected from pixels surrounding the filter object pixel on the image data. A comparator compares the absolute value with a threshold. A selector outputs the value of the at least one pixel if the absolute value is less than the threshold, and outputs the value of the filter object pixel if the absolute value is not less than the threshold. A convolution operator convolutes a filter coefficient with the value output from the selector, and outputs a convolution result as a filtered value of the filter object pixel.

17 Claims, 10 Drawing Sheets

U.S. PATENT DOCUMENTS

| | | |
|---|---|---|
| 2006/0215928 A1 | 9/2006 | Obara |
| 2006/0222259 A1 | 10/2006 | Obara |
| 2006/0245499 A1* | 11/2006 | Chiu et al. ............. 375/240.18 |
| 2007/0071095 A1* | 3/2007 | Lim ...................... 375/240.08 |

FOREIGN PATENT DOCUMENTS

| | | |
|---|---|---|
| JP | 2000-102020 | 4/2000 |
| JP | 2003-179921 | 6/2003 |

* cited by examiner

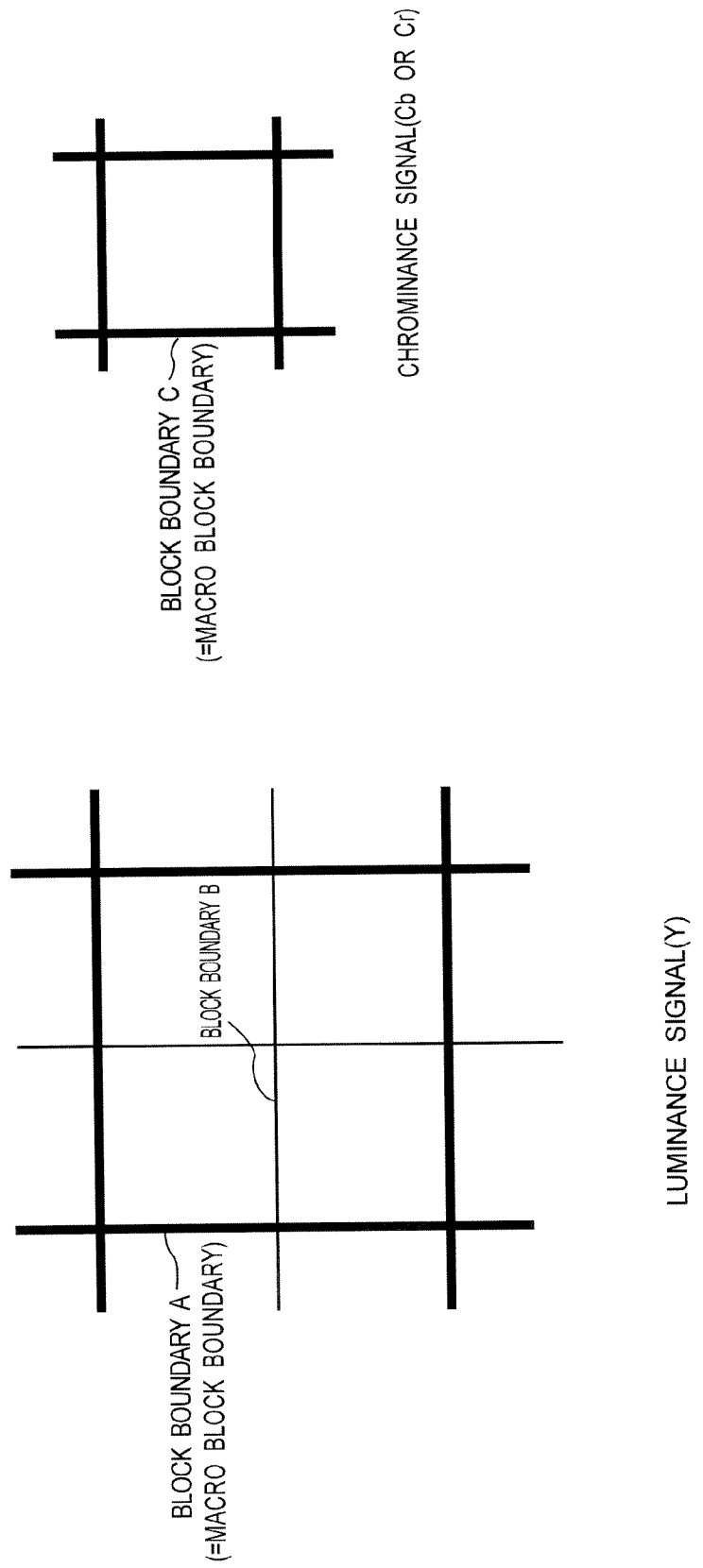

| 8 | 16 | 19 | 22 | 26 | 27 | 29 | 34 |
|---|---|---|---|---|---|---|---|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

FIG. 12B  DEFAULT SET VALUE (horizontal frequency →, vertical frequency ↓)

| 8 | 16 | 16 | 23 | 30 | 36 | 41 | 49 |
|---|---|---|---|---|---|---|---|
| 16 | 20 | 23 | 28 | 36 | 41 | 48 | 54 |
| 20 | 22 | 30 | 36 | 40 | 48 | 50 | 57 |
| 22 | 26 | 34 | 37 | 41 | 50 | 55 | 69 |
| 26 | 32 | 37 | 39 | 46 | 52 | 69 | 100 |
| 34 | 35 | 41 | 44 | 52 | 69 | 105 | 111 |
| 36 | 36 | 44 | 49 | 67 | 100 | 151 | 176 |
| 38 | 42 | 52 | 69 | 100 | 111 | 176 | 226 |

FIG. 12A  USER SET VALUE (horizontal frequency →, vertical frequency ↓)

DECODING APPARATUS AND DECODING METHOD

CROSS-REFERENCE TO RELATED APPLICATIONS

This application is based upon and claims the benefit of priority from prior Japanese Patent Application No. 2005-363626, filed on Dec. 16, 2005; the entire contents of which are incorporated herein by reference.

FIELD OF THE INVENTION

The present invention relates to a decoding apparatus and a decoding method for filtering picture data decoded from coded picture data.

BACKGROUND OF THE INVENTION

Recently, processing techniques to encode and decode a moving picture have been rapidly developed. In a digital television receiving digital broadcast and a record/play apparatus having a recording medium such as a HDD (Hard Disk Drive) or a DVD (Digital Versatile Disk), MPEG-2 (Moving Picture Experts Group) format is mainly used.

The MPEG-Encoding (represented as MPEG-2 format) is a coding method using MC (Motion Compensation Prediction) and DCT (Discrete Cosine Transformation). In case of encoding at a low bit rate, "block noise" generated around a block boundary and "ringing noise" generated around an edge boundary are often perceived.

In JP-A (Kokai) No. 2003-179921, a method for reducing such noise (caused by the MPEG-Encoding) by using coding information is disclosed. In this method, by referring to coding information (quantization information, DCT coefficient information, motion vector information) obtained by decoding MPEG coding data, a kind and an intensity of a filter to reduce the noise of decoded image are switched.

As the kind of the filter, a block noise reduction filter, a mosquito noise reduction filter, and a Gaussian filter are applied. In this case, mosquito noise means ringing noise.

In JP No. 3464908, a block noise reduction filter (de-block filter) is disclosed. Furthermore, in JP-A (Kokai) No. 2000-102020, a ringing noise reduction filter (de-ringing filter) is disclosed.

In JP-A No. 2003-179921, in order to reduce processing quantity, an adaptive filter is selected by referring to coding information only. However, if decoded image quality estimated by the coding information is largely different from actual decoded image quality, the noise cannot be sufficiently reduced. Furthermore, a signal to be originally existent is erroneously reduced.

SUMMARY OF THE INVENTION

The present invention is directed to a decoding apparatus and a decoding method for accurately reducing noises included in decoded image data by post-filtering.

According to an aspect of the present invention, there is provided a decoding apparatus comprising: a decoder configured to obtain image data from an encoded image data by orthogonal transformation decoding; a de-ringing filter configured to filter the image data, wherein the de-ringing filter comprising: a subtracter configured to generate an absolute value of difference between a value of a filter object pixel and a value of at least one pixel selected from pixels surrounding the filter object pixel; a comparator configured to compare the absolute value with a threshold; a selector configured to output the value of the at least one pixel if the absolute value is less than the threshold, and to output the value of the filter object pixel if the absolute value is not less than the threshold; and a convolution operator configured to convolute a filter coefficient with the value output from the selector, and to output a convolution result as a filtered value of the filter object pixel.

According to another aspect of the present invention, there is also provided a decoding method comprising: obtaining image data from an encoded image data by orthogonal transformation decoding; filtering the image data; generating an absolute value of difference between a value of a filter object pixel and a value of at least one pixel selected from pixels surrounding the filter object pixel; comparing the absolute value with a threshold; outputting the value of the at least one pixel if the absolute value is less than the threshold; outputting the value of the filter object pixel if the absolute value is not less than the threshold; convoluting a filter coefficient with the value outputted; and outputting a convolution result as a filtered value of the filter object pixel.

According to still another aspect of the present invention, there is also provided a computer readable medium that stores a computer program for causing a computer to decode image data, the computer program comprising: a first program code to obtain image data from an encoded image data by orthogonal transformation decoding; a second program code to filter the image data; a third program code to generate an absolute value of difference between a value of a filter object pixel and a value of at least one pixel selected from pixels surrounding the filter object pixel; a fourth program code to compare the absolute value with a threshold; a fifth program code to output the value of the at least one pixel if the absolute value is less than the threshold; a sixth program code to output the value of the filter object pixel if the absolute value is not less than the threshold; a seventh program code to convolute a filter coefficient with the value outputted; and a eighth program code to output a convolution result as a filtered value of the filter object pixel.

BRIEF DESCRIPTION OF THE DRAWINGS

FIGS. 11A and 11B are schematic diagrams to explain relationship between a macro block boundary and blocks for MPEG-2.

FIGS. 12A and 12B are schematic diagrams to explain a quantization matrix for MPEG-2.

DETAILED DESCRIPTION OF THE EMBODIMENTS

Figure 1:
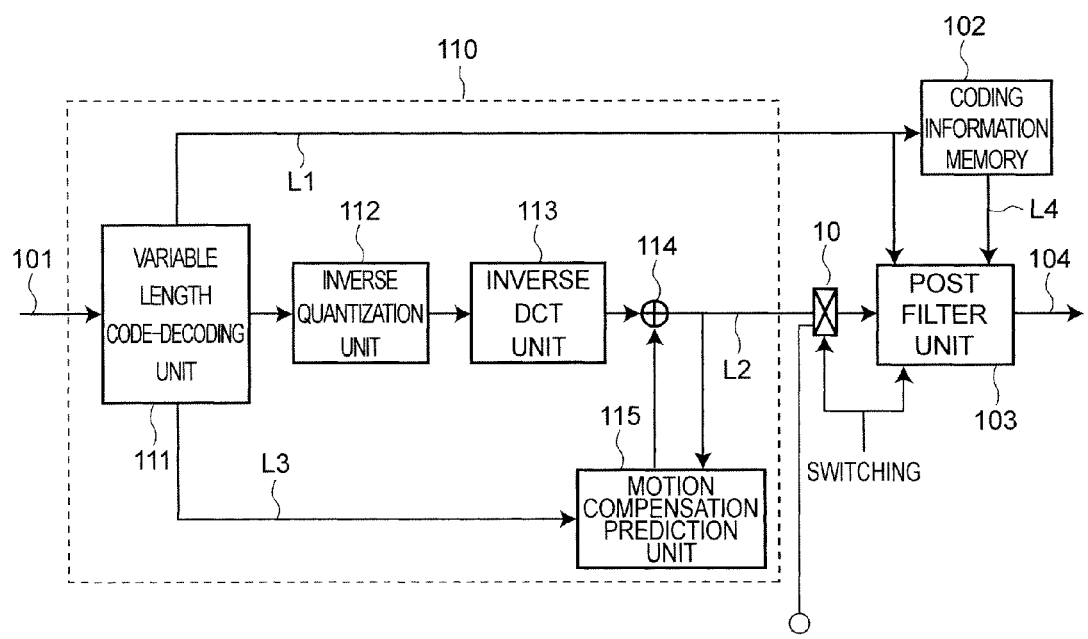
FIG. 1 is a block diagram of a decoding apparatus according to one embodiment of the present invention.

Hereinafter, various embodiments of the present invention will be explained by referring to the drawings. The present invention is not limited to the following embodiments.

FIG. 1 is a block diagram of a decoding apparatus according to one embodiment of the present invention. In the present embodiment, processing of the decoding apparatus is explained using a bit stream of MPEG-2. However, a bit stream of coding method using another MC and DCT may be used.

As shown in FIG. 1, the decoding apparatus includes a video decoding unit 110, a post filter unit 103, and a coding information memory 102. The video decoding unit 110 includes a variable length code-decoding unit 111, an inverse quantization unit 112, an inverse DCT unit 113, an adder 114, and a motion compensation prediction unit 115.

Furthermore, a switchover unit 10 is set between the video decoding unit 110 and the post filter unit 103. The switchover unit 10 switches an internal signal (decoded image data from the video decoding unit 110) and an external signal from the outside.

In such decoding apparatus, a bit stream 101 of MPEG-2 format is supplied to and decoded by the video decoding unit 110. This decoded image data is filter-processed by the post filter unit 103.

In the video decoding unit 110, first, a bit stream 101 of MPEG-2 format is supplied to the variable length code-decoding unit 111, and coding information (quantization information, DCT coefficient information, motion vector information, etc.) is decoded. This coding information L1 is supplied to the coding information memory 102 and the post filter unit 103.

Furthermore, image data decoded by the variable length code-decoding unit 111 is supplied to the inverse quantization unit 112, and DCT coefficient information is inversely quantized. The DCT coefficient (inversely quantized by the inverse quantization unit 112) is supplied to and inversely transformed by the inverse DCT unit 113. An output signal (inversely transformed) from the inverse DCT unit 113 is supplied to the adder 114.

On the other hand, coding information L3 (quantization information, DCT coefficient information, motion vector information, etc.) is input to the motion compensation prediction unit 115, and the motion compensation prediction unit 115 generates a motion compensation prediction value. The motion compensation prediction value is supplied from the motion compensation prediction unit 115 to the adder 114.

If the output signal from the inverse DCT unit 113 is a MC (Motion Compensation) error, the adder 114 adds the MC error to a prediction signal from the motion compensation prediction unit 115, and an image signal as the addition result is regenerated. On the other hand, if the output signal from the inverse DCT unit 113 is not the MC error, the prediction signal is not supplied from the motion compensation prediction unit 115 to the adder 114. In this case, the output signal from the inverse DCT unit 113 is regenerated as a decoded image signal through the adder 114.

An image signal L2 output from the adder 114 is stored in a frame memory of the motion compensation prediction unit 115, and supplied to the post filter unit 103.

By supplying coding information L1 from the variable length code-decoding unit 111, the coding information memory 102 stores coding information of a picture to be referred for motion compensation prediction. The coding information stored in the coding information memory 102 is supplied to the post filter unit 103. In this case, the coding information of a picture to be referred is supplied to the post filter unit 103.

By using coding information L1 (quantization information, DCT coefficient information, motion vector information) from the variable length code-decoding unit 111 and coding information L4 (of a picture to be referred) from the coding information memory 102, the post filter unit 103 estimates a degradation degree (Hereinafter, it is called "Q-value") of image quality. By analyzing the decoded image signal L2 using the Q-value, processing of a de-ringing filter, a vertical de-block filter, and a horizontal de-block filter (explained afterwards) are controlled.

In the post filter unit 103, the de-ringing filter, the vertical de-block filter, and the horizontal de-block filter may be cascade-connected. Furthermore, the de-ringing filter, the vertical de-block filter, and the horizontal de-block filter are adaptively controlled by the Q-value. In this way, a reproduction image signal 104 filter-processed by the post filter unit 103 is output.

Figure 2:
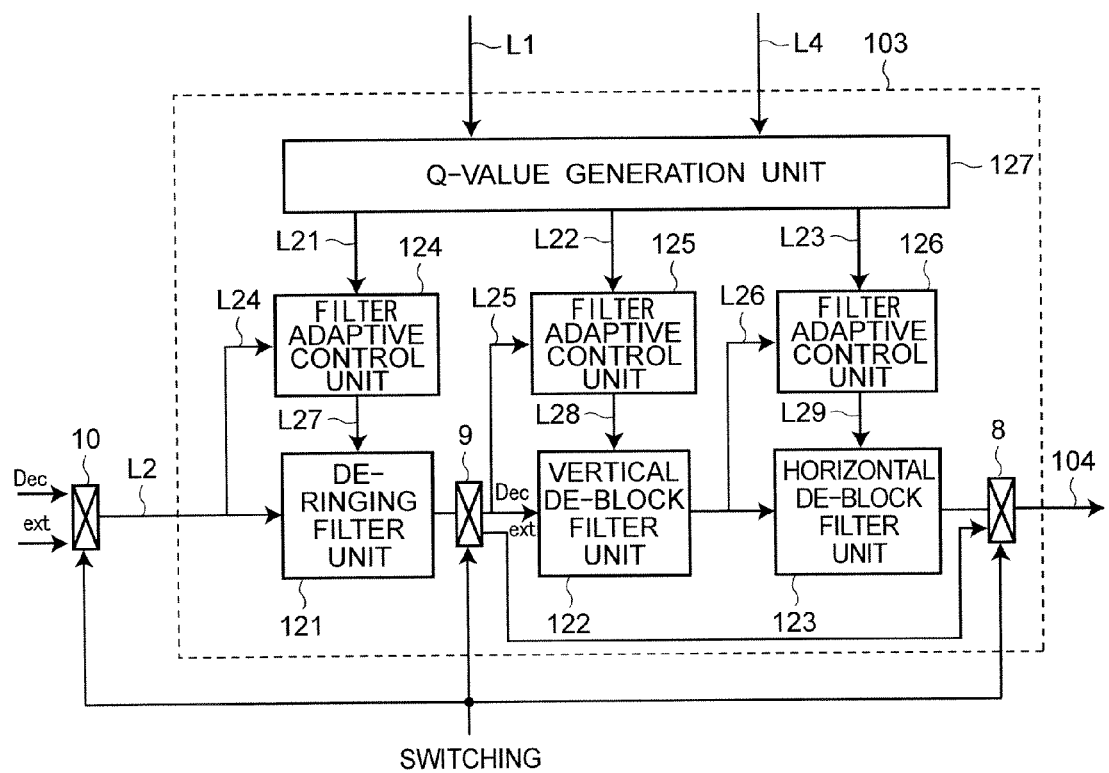
FIG. 2 is a block diagram of a post filter unit in FIG. 1.

Next, FIG. 2 is a block diagram of the post filter unit 103. As shown in FIG. 2, the post filter unit 103 includes a Q-value generation unit 127, a de-ringing filter unit 121, a vertical de-block filter unit 122, and a horizontal de-block filter unit 123. Furthermore, a first filter adaptive control unit 124 is connected to the de-ringing filter unit 121; a second filter adaptive control unit 125 is connected to the vertical de-block filter unit 122; and a third filter adaptive control unit 126 is connected to the horizontal de-block filter unit 123. Each filter control unit controls the connected filter unit to filter the decoded image signal.

In the post filter unit 103, coding information L1 from the variable length code-decoding unit 111 and coding information L4 from the coding information memory 102 are supplied to the Q-value generation unit 127. The Q-value generation unit 127 generates a Q-value using the coding information of a picture (as a filter object picture) and a reference picture.

In this case, the Q-value generation unit 127 generates Q-values L21, L22, and L23 each suitable for the de-ringing filter unit 121, the vertical de-block filter unit 122, and the horizontal de-block filter unit 123. The Q-value generation unit 127 respectively supplies Q-values L21, L22, and L23 to the first filter adaptive control unit 124, the second filter adaptive control unit 125, and the third filter adaptive control unit 126.

The first filter adaptive control unit 124, the second filter adaptive control unit 125, and the third filter adaptive control unit 126 respectively obtain values L24, L25, and L26 of a filter object pixel and pixels surrounding the filter object pixel from decoded image information L2, and respectively generate a control signals L27, L28, and L29 using the Q-value and values of the filter object pixel and surrounding pixels. Thus, the de-ringing filter 121, the vertical de-block filter unit 122, and the horizontal de-block filter 123 are controlled to adaptively execute processing.

In this way, the decoded image information L2 is suitably filter-processed by the de-ringing filter unit 121, the vertical de-block filter unit 122, and the horizontal de-block filter unit 123, and outputted as reproduction image information 104.

Furthermore, in the post filter unit 103, a switchover unit 9 is set between the de-ringing filter unit 121 and the vertical de-block filter unit 122, and a switchover unit 8 is set between the de-ringing filter unit 121 and the horizontal de-block filter 123.

In case of inputting an internal signal (Dec: decoded image signal), the switchover units 9 and 8 select the vertical de-block filter unit 122 and the horizontal de-block filter unit 123 in order to pass the signal. On the other hand, in case of inputting an external signal (ext), the switchover units 9 and 8 do not select the vertical de-block filter unit 122 and the horizontal de-block filter unit 123 in order not to pass the signal.

Briefly, in case of inputting the internal signal (Dec), the internal signal passes the de-ringing filter unit 121, the vertical de-block filter unit 122, and the horizontal de-block filter unit 123 in order. On the other hand, in case of inputting the external signal (ext), the external signal passes the de-ringing filter unit 121, but skips the vertical de-block filter unit 122 and the horizontal de-block filter unit 123.

In the internal signal (Dec), a noise occurs at a block boundary based on a coding rule (For example, at intervals of eight pixels). However, in the external signal (ext), a rule of block boundary is unfixed. If the de-block filter is subjected to an erroneous noise-position on the block of the external signal, image quality may fall. Accordingly, by switching the internal signal (Dec) and the external signal (ext), the post filter unit 103 can be applied to the external signal (ext).

Furthermore, in FIG. 2, filtering order is represented as the de-ringing filter unit 121, the vertical de-block filter unit 122, and the horizontal de-block filter unit 123. However, this filtering order may be changed.

Figure 3:
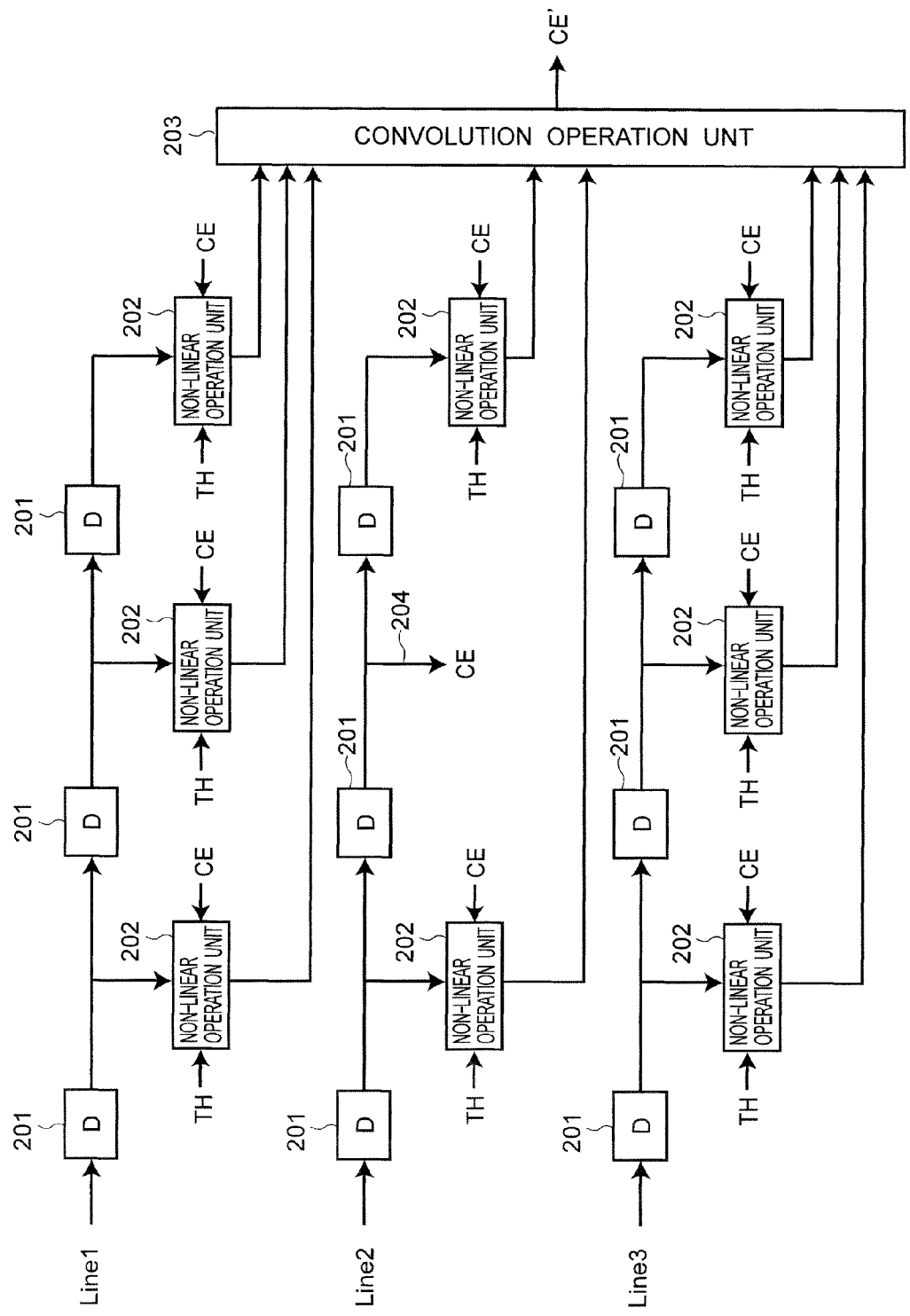
FIG. 3 is a block diagram of a de-ringing filter in FIG. 2.

Next, FIG. 3 is a block diagram of the de-ringing filter unit 121. In FIG. 3, as an example, a "3×3" mask composed by a filter object pixel and eight pixels neighboring (surrounding) the filter object pixel along top and bottom, right and left, and oblique directions is explained.

As shown in FIG. 3, three delay circuits "D" 201 are in each of Line 1, Line 2, and Line 3. Furthermore, three non-linear operation units 202 are in each of Line 1 and the Line 3, and two non-linear operation units 202 are in Line 2. A convolution operation unit 203 computes convolution of signals from each non-linear operation unit 202.

The Line 2 is a line including the filter object pixel; the Line 1 is an upper line of the Line 2; and the Line 3 is a lower line of the Line 2. Furthermore, a memory (not shown in FIG. 3) stores pixel values of the Lines 1, 2, and 3.

In FIG. 3, blocks "D" 201 are delay circuits of one pixel, and "TH" is a threshold level for the non-linear operation unit 202. Furthermore, "CE" is a value 204 of the filter object pixel, and "CE'" is a pixel value of convolution result of the filter object pixel.

In case that a quantization value (quantiser_scale) is previously known, "TH" is calculated as follows.

$$TH = 2 \times quantiser\_scale$$

Eight pixels surrounding the filter object pixel are non-linearly processed by the non-linear operation unit 202.

Figure 4:
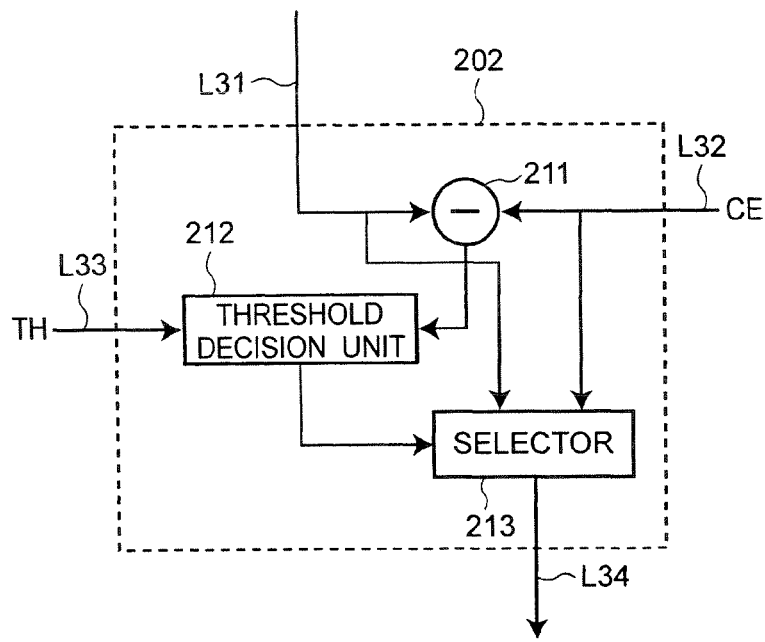
FIG. 4 is a block diagram of non-linear operation unit in FIG. 3.

Next, component and operation of the non-linear operation unit shown in FIG. 3 is explained by referring to FIG. 4. As shown in FIG. 4, the non-linear operation unit 202 includes a subtracter 211, a threshold decision unit 212, and a selector 213.

In such non-linear operation unit 202, first, a value L31 of any one of surrounding eight pixels and a value L32 of the filter object pixel are input to the subtracter 211, and a difference between the values L31 and L32 is calculated. The difference is supplied from the subtracter 211 to the threshold decision unit 212. The threshold decision unit 212 compares an absolute value of the difference (AD) (output from the subtracter 211) to a threshold (TH) L33, and decides which value is larger. This decision result as flag information (FLG) is supplied to the selector 213. One example of guidance function of the flag information is represented as follows (Expression by C language).

$$FLG = (AD > TH) ? 1 : 0;$$

In this case, if AD is less than TH, "0" is output, and if AD is not less than TH, "1" is output.

The selector 213 selects one of the value L32 of the filter object pixel and the value L31 of any one of surrounding eight pixels by referring to the flag (FLG) information. For example, if the flag information is "0" (AD is less than TH), the value L31 of one of surrounding eight pixels is output as L34. On the other hand, if the flag information is "1" (AD is not less than TH), the value L32 of the filter object pixel is output as L34.

Next, as shown in FIGS. 3 and 4, pixel values L34 output from each non-linear operation unit 202 (set to the Lines 1, 2 and 3) are supplied to the convolution operation unit 203. The convolution operation unit 203 convolutes each pixel value L34 with a filter coefficient, and calculates a sum of convolution result of each pixel value L34. The sum of convolution result is output as a filtered value "CE'" of the filter object pixel.

In this way, in the threshold decision unit 212, if a difference between a value of the filter object pixel and a value of one pixel of surrounding eight pixels is not above a threshold, the value of the one pixel is output. If the difference is above the threshold, the value of the filter object pixel is output. As a result, a kind and an intensity of noise on the decoded image is accurately estimated, and the noise occurred by MPEG-encoding can be reduced.

Figure 5:
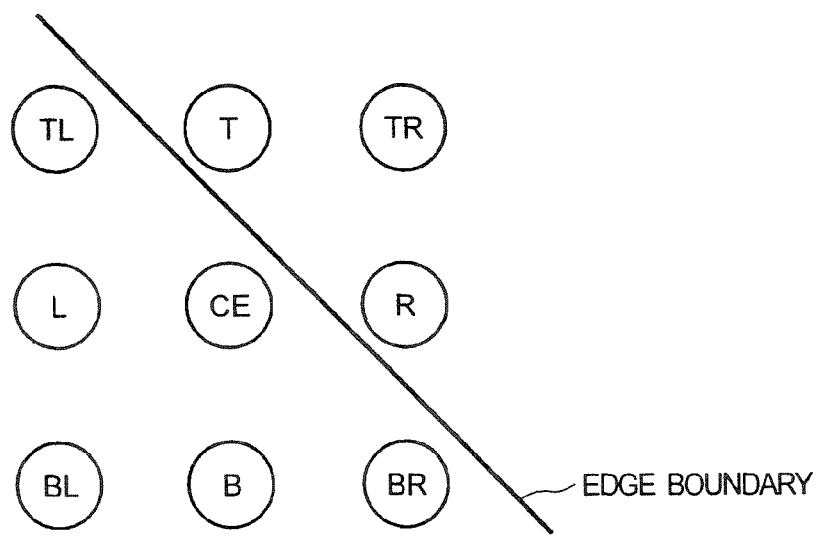
FIG. 5 is a schematic diagram to explain processing of the de-ringing filter.

Next, effect of the de-ringing filter is qualitatively explained by referring to FIG. 5. As shown in FIG. 5, a value of the filter object pixel is "CE", a value of each of surrounding eight pixels are "TL", "T", "TR", "L", "R", "BL", "B" and "BR" from the left upper side to the right lower side in order.

In this case, as shown in FIG. 5, assume that an edge boundary obliquely exists between "TL" and "T", "CE" and "T", "CE" and "TR", "CE" and "R", "BR" and "R". Furthermore, assume that an absolute value of a difference between a value of "CE" and a value of "T", an absolute value of a difference between the value of "CE" and a value of "TR", and an absolute value of a difference between the value of "CE" and a value of "R" are respectively above the threshold. In this case, the values of "T", "TR", and "R" are respectively replaced by the value of "CE".

If the filter coefficient for each of surrounding eight pixels is "⅛", the filtered value "CE'" is calculated as follows.

$$CE' = (TL + CE + CE + L + CE + BL + B + BR)/8$$

Briefly, the larger the number of surrounding pixels each having a difference from the filter object pixel above the threshold is, the weaker the smoothing filter is, because a ratio of the pixel value "CE" in the surrounding pixels is high. On the other hand, the fewer the number of surrounding pixels each having a difference from the filter object pixel above the threshold is, the stronger the smoothing filter is, because a ratio of the pixel value "CE" in the surrounding pixels is low.

Ringing noise on a flat part (In FIG. 5, "L", "BL", "B") neighboring an edge boundary is easy to be recognized, and ringing noise on the edge boundary part (In FIG. 5, "TL", "CE", "BR", "T", "R") is not easy to be recognized. The de-ringing filter of this embodiment is a strong smoothing filter for the flat part, and a weak smoothing filter for the edge boundary part. Accordingly, the de-ringing filter of this embodiment can also reduce ringing noise when ringing-noise reduction ability falls (For example, by reducing the hardware scale).

Next, a concrete example of the first filter adaptive control unit 124 is explained. In FIG. 2, the first filter adaptive control unit 124 receives Q-value L21 from the Q-value generation unit 127 and decoded pixel values L24 from the video decoding unit 110. By using two input values L21 and L24, the first filter adaptive control unit 124 generates a threshold (TH) of the de-ringing filter, and supplies the threshold (TH) L27 to the de-ringing filter unit 121.

Figure 6:
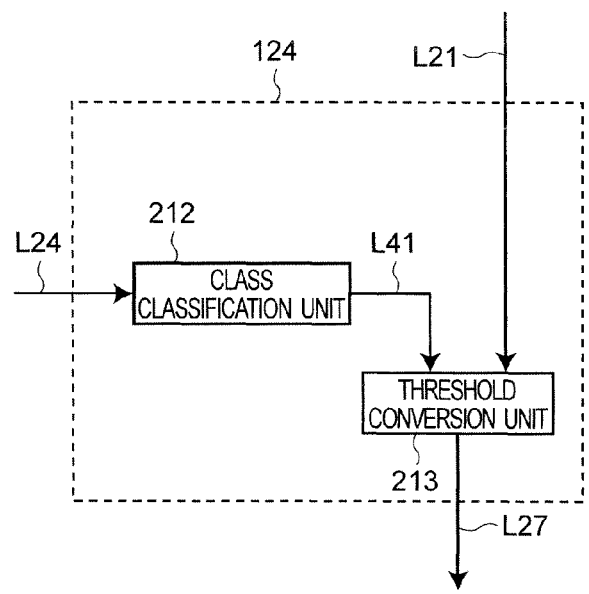
FIG. 6 is a block diagram of a first filter adaptive control unit in FIG. 2.
Figure 7:
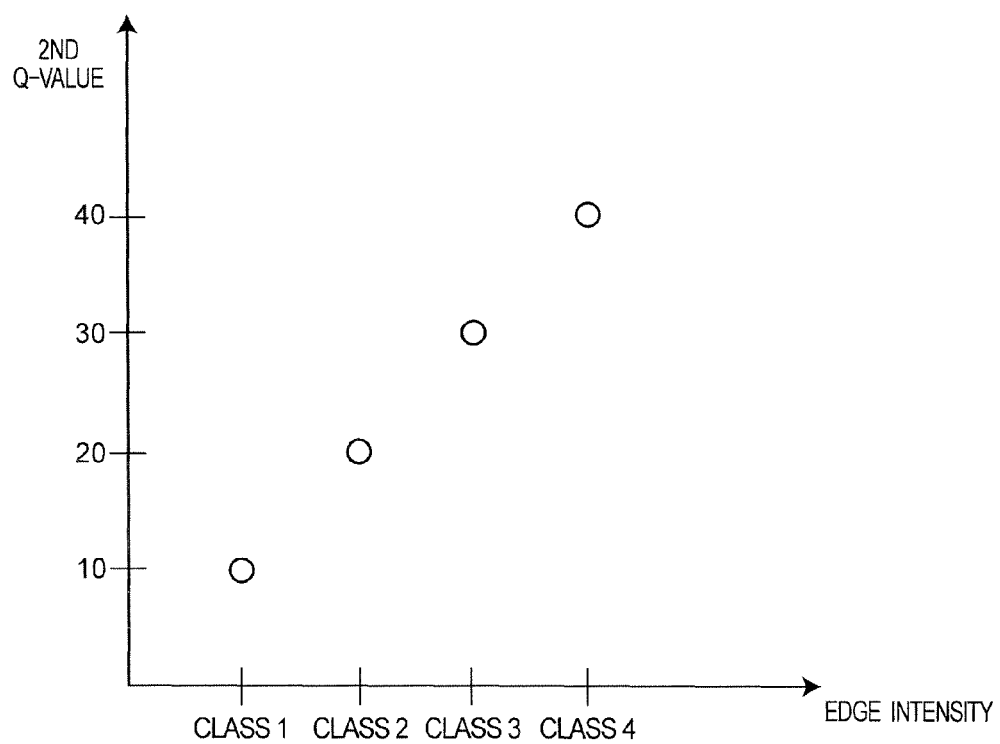
FIG. 7 is a graph of edge intensity versus second Q-value.

Next, a conversion means of the first filter adaptive control unit 124 is explained by referring to FIGS. 6 and 7. As shown in FIG. 6, pixel values L24 of a block (by unit of DCT) including a filter object pixel are supplied to the filter adaptive control unit 124. The pixel values L24 of the block are supplied to a class classification unit 212, and classified into a plurality of classes based on edge intensity included in the block.

FIG. 7 is a graph of the second Q-value versus the edge intensity (class 1, 2, 3 and 4). The class classification unit 212 assigns the second Q-value L41 corresponding to the edge intensity (classification result), and outputs the second Q-value L41. As shown in FIG. 7, the larger the edge intensity is, the larger the second Q-value is. This relationship is caused by qualitative reason that, if a clear edge exists in DCT block, the ringing influence by quantization grows large.

As an example to calculate the edge intensity in the block, a maximum and a minimum of pixel values in the block are detected, and a difference (DR: dynamic range) between the maximum and the minimum is set as the edge intensity. Conversion from the dynamic range to the second Q-value is, for example, represented as "DR/2".

In case of scanning the de-ringing filter in raster order, a line memory of large quantity is necessary to obtain pixel values of each block. In this case, by obtaining pixel values L24 in the block stored in the line memory prepared, the edge intensity may be calculated.

In FIG. 6, the first Q-value (Q1) L21 and the second Q-value (Q2) L41 are supplied to a threshold conversion unit 213. The threshold conversion unit 213 calculates a threshold TH (Q1, Q2) as a function value of two Q-values, and outputs the threshold (TH) L27. A function TH (Q1, Q2) is represented as following equation. (w: weight coefficient of "0~1")

$$TH(Q1, Q2) = (1-w) \times Q1 + w \times Q2$$

Next, examples of the second filter adaptive control unit 125, the third filter adaptive control unit 126, the vertical de-block filter unit 122, and the horizontal de-block filter unit 123 are explained.

Figure 8:
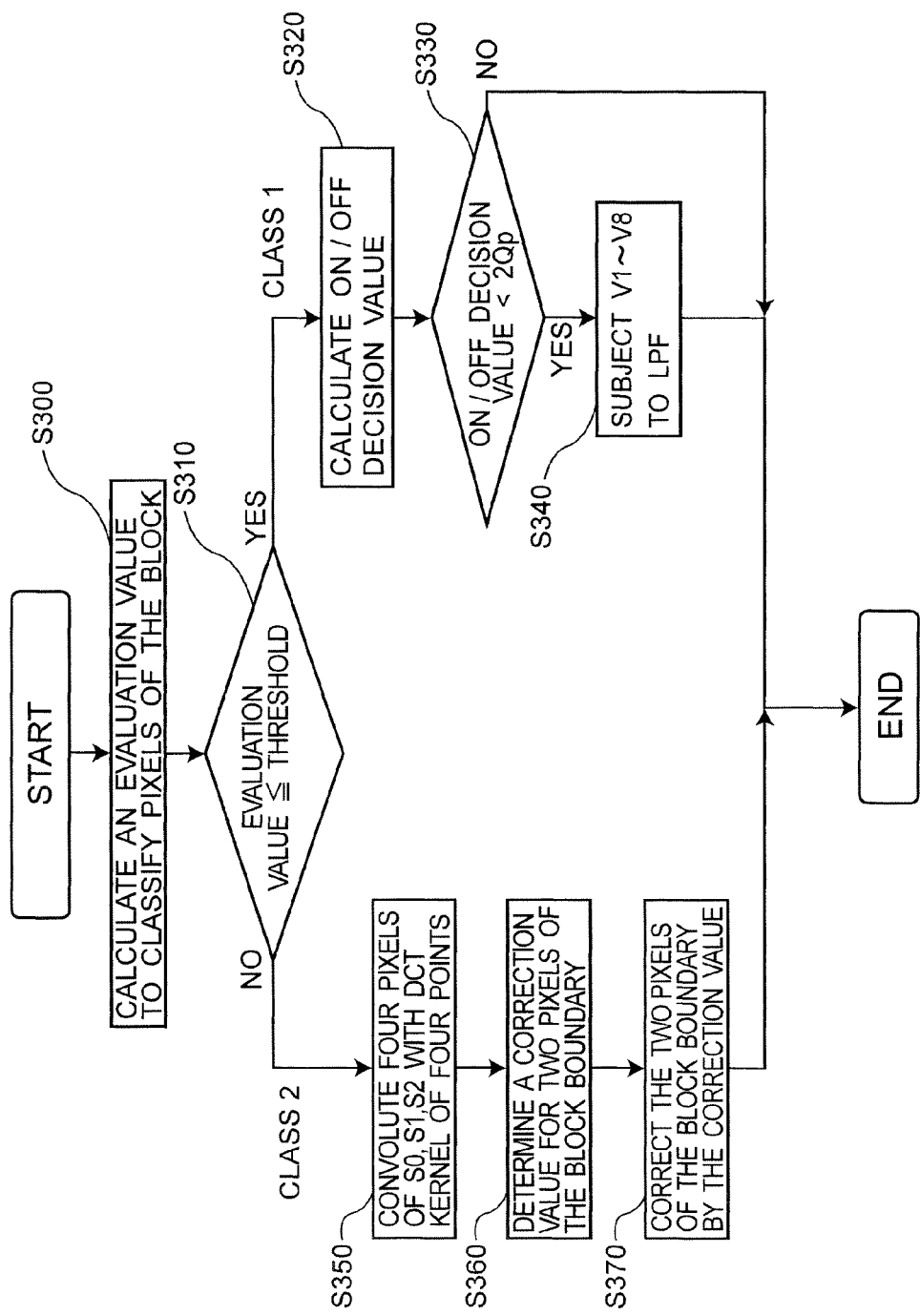
FIG. 8 is a flow chart of processing of a de-block filter in FIG. 2.
Figure 9:
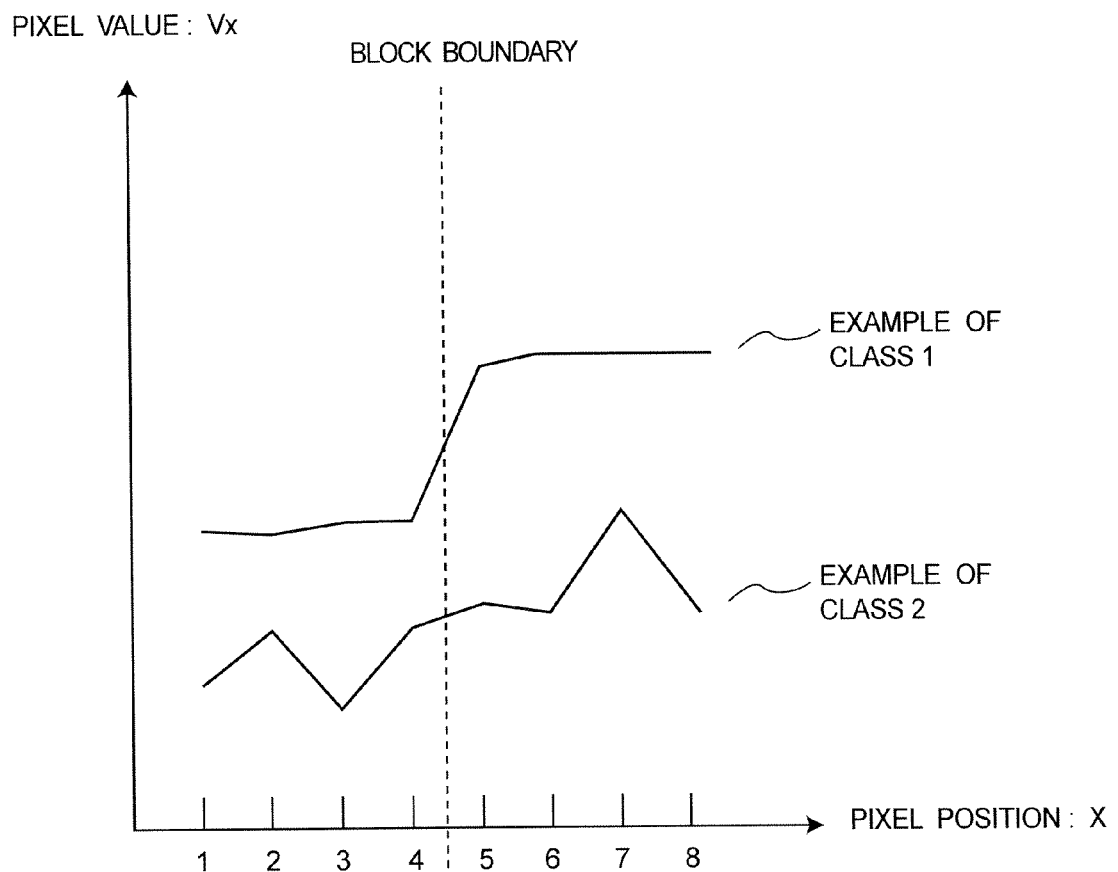
FIG. 9 is a schematic diagram to explain classification by the de-block filter.
Figure 10:
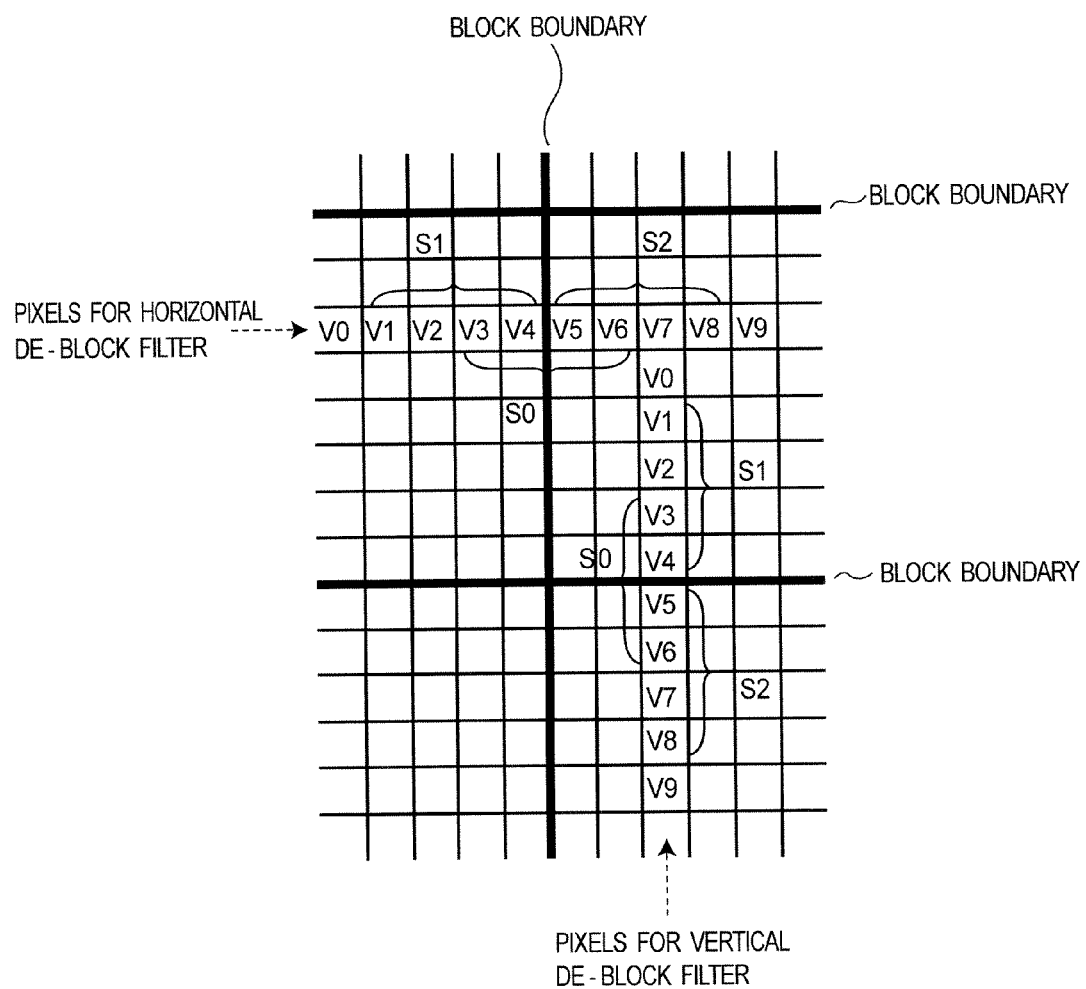
FIG. 10 is a schematic diagram to explain relationship between a block boundary and pixels for de-block filter processing.

FIG. 8 is a flow chart of processing of the de-block filter. FIG. 9 is a graph of pixel position versus pixel value. In FIG. 9, a horizontal axis represents the pixel position and a vertical axis represents the pixel value. FIG. 10 shows a positional relationship between pixel arrangement along a horizontal direction and a vertical direction, and a block boundary.

First, as shown in FIG. 9, a difference between two neighboring pixels along the horizontal direction and the vertical direction is respectively calculated. Pixels along the horizontal direction and the vertical direction are respectively classified into two classes, and de-block filter processing suitable to the class is respectively executed to the pixels along the horizontal direction and the vertical direction.

Class 1: Class Having a Gentle Change of Pixel Value.

This class represents a gentle change part such as sky, clouds, or person's facial skin. In this part, even if a difference between two pixels including a block boundary is small, a block noise can be visually recognized by a user. As shown in class 1 of FIG. 9, this part mainly represents a flat signal except for a block boundary part. Accordingly, as shown in FIG. 10, the four pixels on both sides of the boundary line are each subject to a strong LPF. In FIG. 10, the horizontal de-block filter is respectively executed to the left side pixels V1, V2, V3, V4 and the right side pixels V5, V6, V7, V8. The vertical de-block filter is executed to the upper side pixels V1, V2, V3, V4 and the lower side pixels V5, V6, V7, V8.

Class 2: Another Class.

This class represents a large change part of pixel values in a block. In this part, if a difference between two pixels including the block boundary is not greatly larger than another change part in the block, a block noise cannot be visually recognized by the user. In such case, in order not to blur a texture (change part) in the block, a value of each one pixel on both side of the boundary line is corrected. As a result, the block boundary is not clearly shown on the image. In FIG. 10, the horizontal de-block filter corrects values of the left side pixel V4 and the right side pixel V5 of the block boundary. The vertical de-block filter corrects values of the upper side pixel V4 and the lower side pixel V5 of the block boundary.

Above-mentioned processing is further explained referring to FIG. 8. Classification to class 1 or 2 is executed at S300 and S310 of FIG. 8. First, as shown in FIG. 10, an evaluation value for classification is calculated from pixel values V0~V9 on both sides of the block boundary along the horizontal direction and the vertical direction (S300). Concretely, an absolute value ( ) of a difference between two neighboring pixels is calculated for pixels along the horizontal direction and the vertical direction. In FIG. 10, the absolute values of nine units are respectively obtained along the horizontal direction and the vertical direction. A number of units of which absolute value is below a first threshold (For example, 2) is counted and set as the evaluation value.

Next, The evaluation value is compared with a second threshold (For example, 6) (S310). As a result, if the evaluation value is below the second threshold (Yes at S310), pixel value-variation except for the edge boundary part is decided to be smooth, and processing corresponding to class 1 is executed (S320). If the evaluation value is not below the second threshold (No at S310), pixel value-variation except for the edge boundary part is decided not to be smooth, and processing corresponding to class 2 is executed (S350).

(Processing of Class 1)

First, a decision value to set the de-block filter "on/off" is calculated (S320). This decision value is, as shown in FIG. 10. a difference between a maximum and a minimum of four pixels on both sides of the edge boundary part. The four pixels are: V1, V2, V3, V4 on the left side and V5, V6, V7, V8 on the right side along the horizontal direction, and V1, V2, V3, V4 on the upper side and V5, V6, V7, V8 on the lower side along the vertical direction.

Next, if the decision value (calculated at S320) is below double $Q_p$, the de-block filter is set "on". If the decision value is not below double $Q_p$, the de-block filter is set "off" (S330). "$Q_p$" is a quantization variable of a block including the pixel V5.

In case of the de-block filter "on" (Yes at S330), as shown in FIG. 10, four pixels on both sides of the edge boundary part (V1, V2, V3, V4 on the left side and V5, V6, V7, V8 on the right side along the horizontal direction, V1, V2, V3, V4 on the upper side and V5, V6, V7, V8 on the lower side along the vertical direction) are subjected to a low pass filter LPF (S340), and the processing is completed. In case of the de-block filter "off" (No at S330), the processing is completed without filter processing.

(Processing of Class 2)

In FIG. 10, DCT kernel of four points is respectively convoluted with four pixels of S0 (V3, V4, V5, V6 along the horizontal axis and the vertical axis), S1 (V1, V2, V3, V4 along the horizontal direction and the vertical direction), S2 (V5, V6, V7, V8 along the horizontal direction and the vertical direction), and a sum of the convolution result of each of the four pixels is respectively calculated for the four pixels of S0, S1, and S2 (S350).

Next, by using $Q_p$ and the sum, a correction value of V4 and V5 is respectively calculated in order not to clearly show the block boundary (S360). By using the correction value, pixel values of V4 and V5 are corrected (S370), and the processing is completed.

In this way, as to a set of the second filter adaptive control unit 125 and the vertical de-block filter unit 122, and a set of the third filter adaptive control unit 126 and the horizontal de-block filter unit 123, the processing flow is the same while the filtering direction is different.

In the above-explanation, values L25 and L26 of pixels V0~V9 are respectively supplied to the second filter adaptive control unit 125 and the third filter adaptive control unit 126. By executing steps S300, S310, S320, S330, S350, and S360 of FIG. 8, any of "de-block filter of class 1 is subjected", "correction of class 2 is subjected" and "non-processing".

As a result, the second filter adaptive control unit 125 supplies decision result L28 to the vertical de-block filter unit 122. Furthermore, the third filter adaptive control unit 126 supplies decision result L29 to the horizontal de-block filter unit 123. The vertical de-block filter unit 122 and the horizontal de-block filter unit 123 respectively execute processing of S340 and S370 using the decision result L28 and L29.

As to the processing of class 2, a low pass filter LPF may filter each pixel on both sides of the block boundary (V4 and V5 along the horizontal direction and the vertical direction) (S370). In this case, the evaluation value "d" is calculated as follows (S350), and "on/off" of the de-block filter is determined by using "d" and "$Q_p$".

$$d=(V3-3\times V4+3\times V5-V6)/2$$

In the above equation, an average of a difference between V5 and V6 and a difference between V4 and V5 is calculated, and a difference between V4 and V5 is calculated. By subtracting the average from the difference between V4 and V5, "d" is obtained. As mentioned-above, a quantization value $Q_p$ of a block including a pixel V5 is used as an adaptive parameter. In the present embodiment, the Q-value generation unit 127 supplies Q-values L22 and L23 as adaptive parameter.

Next, an example of the Q-value generation unit 127 is explained by referring to FIG. 2. In FIG. 2, the Q-value generation unit 127 generates Q-value from coding information L1 of a filter object picture and coding information L4 of a reference picture. In this case, Q-values L21, L22, and L23 respectively suitable to the de-ringing filter unit 121, the vertical de-block filter unit 122 and the horizontal de-block filter unit 123 are generated. The Q-values L21, L22, and L23 are respectively supplied to the filter adaptive control units 124, 125, and 126.

As to MPEG-2, by quantizing DCT coefficient, coding quantity generated can be reduced with a lower image quality. Briefly, coding information to directly affect on coding noise of MPEG-2 is quantization information, and filter-adaptive processing is realized using the quantization information. As concrete quantization information, "quantization scale ($Q_{sc}$)", "quantization matrix" and "skip macro block" may be used.

Next, the Q-value generation unit 127 of the present embodiment is explained by referring to FIGS. 11A, 11B, 12A, and 12B. FIGS. 11A and 11B are schematic diagrams of a relationship between a macro block boundary and a block of MPEG-2. In MPEG-2 main profile used for digital broadcast or DVD, a macro block is composed by four blocks of a luminance signal (Y) and one block of each of two chrominance signals ($C_b$ and $C_r$).

As shown in FIG. 11A, a thick line represents a macro block boundary, and the thick line and a thin line represent a block boundary. In case of processing of the de-block filter, as mentioned-above, pixels to be filter-processed are included in two neighboring blocks.

In case of a block boundary B represented by thin lines in FIG. 11A, pixels to be filter-processed are included in one (the same) macro block. Accordingly, quantization information of this macro block can be utilized.

on the other hand, in case of a block boundary A represented by thick lines in FIG. 11A, pixels to be filter-processed are included in two neighboring (different) macro blocks. Accordingly, quantization information of the macro block and the neighboring macro block should be utilized. Furthermore, in case of a block boundary C (chrominance signal) represented by thick lines in FIG. 11B, pixels to be filter-processed are always included in two neighboring macro blocks.

In the present embodiment, Q-value used for the de-block filter processing respectively specifies two blocks along the horizontal direction and the vertical direction according to an address of the processing object block. Accordingly, quantization scale of one macro block including the two blocks or quantization scales of two macro blocks each differently including one of the two blocks can be used.

However, in MPEG-2, a skip macro block exists (In MPEG-4, "not_coded" corresponds to the skip macro block.). The skip macro block does not include the quantization information.

Furthermore, in MPEG-2, in case that the skip macro block is included in a P picture, pixel values of a macro block having the same position as the skip macro block in a reference picture for MC (motion compensation) of the P picture are copied.

On the other hand, in case that the skip macro block is included in a B picture, the skip macro block is MC-processed by a predetermined method (detail means is omitted). Briefly, as to the skip macro block, the quantization scale should be generated by a suitable means.

As the simplest generation means, a quantization scale of another macro block nearest to the skip macro block is used as a quantization scale of the skip macro block.

In the present embodiment, the Q-value generation unit 127 receives not only quantization information L1 of a processing object picture but also quantization information L4 of a reference picture. Accordingly, in case of the skip macro block, the quantization of the reference picture is used.

Next, an example to generate a quantization scale of a skip macro block is explained. In case that the skip macro block is included in a P picture, a quantization scale of a macro block having the same position as the skip macro block in a reference picture of the P picture is used. In case that the skip macro block is included in a B picture, a plurality of macro blocks may correspond to the skip macro block in the reference picture. In this case, the largest quantization scale in the plurality of macro blocks is selectively used.

Next, another example to generate a quantization scale of the skip macro block is explained. An average value ($Q_{ave}$) of quantization scales of macro blocks in the reference picture is generated before filtering a processing object picture. As to a skip macro block in the processing object picture, $Q_{ave}$ is used.

Next, an example to generate a quantization scale using quantization information of two blocks is explained.

In one example, a larger quantization scale in two blocks is used.

In a second example, an average of quantization scales of two blocks is used.

On the other hand, as to a quantization scale used for de-ringing filter processing, pixels to be filter-processed exists in the same block. Accordingly, a quantization scale of this block is used. The quantization scale may be set as Q-value. As apparent by the Q-value generation unit, Q-values L21, L22 and L23 are respectively generated for the block and output.

Hereinafter, in the present embodiment, means for generating Q-value based on a quantization matrix is explained. FIGS. 12A and 12B are schematic diagrams to explain the quantization matrix in MPEG-2. In FIGS. 12A and 12B, as to an Intra macro block, a quantization matrix set by a user for encoding and a default quantization matrix are shown as examples. In each matrix of "8×8", the nearer an element position is to the right lower side, the higher a frequency of the element position is.

Actually, a quantization step to quantize DCT coefficient is affected by not only a quantization scale but also a quantization matrix. A conceptual equation to calculate the quantization step using the quantization scale and the quantization matrix is represented as follows.

$$\text{Quantization step} = \text{Quantization scale} \times M(i,j)/16$$

In the above equation, $M(i,j)$ is each element (frequency) of the quantization matrix. If a slope of the quantization matrix is large (a large number of high frequency of the element position exists in the matrix), an average of quantization steps of each DCT coefficient becomes large. Accordingly, Q-value had better be large. Moreover, the quantization matrix is coding information changeable by unit of picture.

In the present embodiment, as a following equation, Q-value is calculated by multiplying a weight (WQ) based on the element value of the quantization matrix with the quantization scale.

$$Q\text{-value} = WQ \times \text{Quantization scale}$$

In the above equation, the weight (WQ) is constant for the (processing object) picture. Before filter-processing of the picture, Q-value for Intra macro block and Q-value for Inter macro block should be respectively prepared.

Concrete equations to calculate the weight (WQ) are represented as follows.

$$WQ = (\Sigma M(i,j)/16)/64 \qquad \text{(Equation 1)}$$

$$WQ = (\Sigma M(i,j)/DM(i,j))/64$$

In the above equations, an element of the quantization matrix of the (processing object) picture is $M(i, j)$, and an element of a default quantization matrix of the picture is $DM(i,j)$.

As mentioned-above, if a difference between a value of the filter object pixel and a value of one pixel of surrounding eight pixels is not above a threshold, the value of the one pixel is output. On the other hand, if the difference is above the threshold, the value of the filter object pixel is output. As a result, a kind and an intensity of noise on the decoded image is accurately estimated, and the noise occurred by MPEG-encoding can be reduced.

In the disclosed embodiments, the processing can be accomplished by a computer-executable program, and this program can be realized in a computer-readable memory device.

In the embodiments, the memory device, such as a magnetic disk, a flexible disk, a hard disk, an optical disk (CD-ROM, CD-R, DVD, and so on), an optical magnetic disk (MD and so on) can be used to store instructions for causing a processor or a computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device. The component of the device may be arbitrarily composed.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A decoding apparatus comprising:
    a decoder configured to obtain image data from an encoded image data by orthogonal transformation decoding;
    a de-ringing filter configured to filter the image data, wherein the de-ringing filter includes,
        a subtracter configured to generate an absolute value of difference between a value of a filter object pixel and a value of at least one pixel selected from pixels surrounding the filter object pixel,
        a comparator configured to compare the absolute value with a first threshold;
        a selector configured to output the value of the at least one pixel if the absolute value is less than the first threshold, and to output the value of the filter object pixel if the absolute value is not less than the first threshold, and
        a convolution operator configured to convolute a filter coefficient with the value output from the selector, and to output a convolution result as a filtered value of the filter object pixel;
    a vertical de-block filter configured to calculate an absolute difference value between each unit of two neighboring pixels along a vertical pixel line crossing a horizontal block boundary of the image data, to count a number of units of which the absolute difference value is less than a second threshold, to decide whether the number of the units is less than a third threshold, and to partially correct values of pixels on the vertical pixel line based on the decision result; and a horizontal de-block filter configured to calculate an absolute difference value between each unit of two neighboring pixels along a horizontal pixel line crossing a vertical block boundary of the image data, to count number of units of which the absolute difference value is less than the second threshold, to decide whether the number of the units is less than the third threshold, and to partially correct values of pixels on the horizontal pixel line based on the decision result.

2. The decoding apparatus according to claim 1, wherein the subtracter, the comparator, and the selector compose a non-linear operation unit, and the non-linear operation unit is respectively set to each of the pixels surrounding the filter object pixel.

3. The decoding apparatus according to claim 2, wherein the convolution operator respectively convolutes the filter coefficient with the value output from each non-linear operation unit, and outputs a sum of each convolution result as the filtered value of the filter object pixel of a reproduction image.

4. The decoding apparatus according to claim 1, further comprising:

a degradation degree estimation unit configured to estimate a degradation degree of image quality based on coding information of the filter object pixel and the pixels surrounding the filter object pixel; and a threshold controlling unit configured to control the first threshold based on the degradation degree and values of pixels in a block including the filter object pixel.

5. The decoding apparatus according to claim 4, wherein, the first threshold is calculated as a function value of the degradation degree and a dynamic range of the values of pixels in the block.

6. The apparatus according to claim 5, further comprising:
a first switchover unit configured to switch the image data and an external signal to the de-ringing filter.

7. The decoding apparatus according to claim 6, further comprising:

a second switchover unit configured to directly output the convolution result from the de-ringing filter by skipping the vertical de-block filter and the horizontal de-block filter if the convolution result is processed from the external signal.

8. The decoding apparatus according to claim 1, wherein the vertical de-block filter calculates a difference between a maximum and a minimum of values of pixels on each side of the vertical pixel line from a cross point between the vertical pixel line and the horizontal block boundary if the number of the units is less than the third threshold, decides whether the difference is less than a quantization variable of a pixel neighboring the horizontal block boundary, and filters the pixels on the side of the vertical pixel line from the cross point if the difference is less than the quantization variable, and the horizontal de-block filter calculates a difference between a maximum and a minimum of values of pixels on each side of the horizontal pixel line from a cross point between the horizontal pixel line and the vertical block boundary if the number of the units is less than the third threshold, decides whether the difference is less than a quantization variable of a pixel neighboring the vertical block boundary, and filters the pixels on the side of the horizontal pixel line from the cross point if the difference is less than the quantization variable.

9. A decoding method comprising:
obtaining image data from an encoded image data by orthogonal transformation decoding;

filtering the image data;

generating an absolute value of difference between a value of a filter object pixel and a value of at least one pixel selected from pixels surrounding the filter object pixel;

comparing the absolute value with a first threshold;

outputting the value of the at least one pixel if the absolute value is less than the first threshold;

outputting the value of the filter object pixel if the absolute value is not less than the first threshold;

convoluting a filter coefficient with the value outputted;

outputting a convolution result as a filtered value of the filter object pixel;

calculating an absolute difference value between each unit of two neighboring pixels along a pixel line vertically crossing a block boundary of the image data;

counting a number of units of which the absolute difference value is less than a second threshold;

deciding whether the number of the units is less than a third threshold; and partially correcting values of pixels on the pixel line based on the decision result.

10. The method according to claim 9, wherein
the generating step, the comparing step, and the value-outputting steps are executed for each of the pixels surrounding the filter object pixel.

11. The method according to claim 10, wherein
the convoluting step is executed to the value outputted for each of the pixels surrounding the filter object pixel, and the convolution result is a sum of the filtered value of each of the pixels surrounding the filter object pixel.

12. The method according to claim 9, further comprising:
estimating a degradation degree of image quality based on coding information of the filter object pixel and the pixels surrounding the filter object pixel; and controlling the first threshold based on the degradation degree and values of pixels in a block including the filter object pixel.

13. The method according to claim 12, wherein
the first threshold is calculated as a function value of the degradation degree and a dynamic range of the values of pixels in the block.

14. The method according to claim 13, further comprising:
switching the image data and an external signal to the de-ringing filter.

15. The method according to claim 14, further comprising:
directly outputting the convolution result without the counting step, the deciding step and the partially-correcting step if the convolution result is processed using the external signal.

16. The method according to claim 9, further comprising:
calculating a difference between a maximum and a minimum of values of pixels on each side of the pixel line from a cross point between the pixel line and the block boundary if the number of the units is less than the third threshold;

deciding whether the difference is less than a quantization variable of a pixel neighboring the block boundary; and filtering the pixels on the side of the pixel line from the cross point if the difference is less than the quantization variable.

17. A non-transitory computer readable medium including computer executable instructions, wherein the instructions, when executed by a computer, cause the computer to perform a method for decoding image data, the method comprising:

obtaining image data from an encoded image data by orthogonal transformation decoding;

filtering the image data;

generating an absolute value of difference between a value of a filter object pixel and a value of at least one pixel selected from pixels surrounding the filter object pixel;

comparing the absolute value with a first threshold;

outputting the value of the at least one pixel if the absolute value is less than the first threshold;

outputting the value of the filter object pixel if the absolute value is not less than the first threshold;

convoluting a filter coefficient with the value outputted;

outputting a convolution result as a filtered value of the filter object pixel;

calculating an absolute difference value between each unit of two neighboring pixels along a pixel line vertically crossing a block boundary of the image data;

counting a number of units of which the absolute difference value is less than a second threshold;

deciding whether the number of the units is less than a third threshold; and partially correcting values of pixels on the pixel line based on the decision result.

* * * * *